(12) United States Patent
Christopher

(10) Patent No.: US 7,565,753 B2
(45) Date of Patent: Jul. 28, 2009

(54) CAR WASH DRYER AND METHOD

(76) Inventor: Todd P. Christopher, 4866 Lisa Ct., Trenton, MI (US) 48183

( * ) Notice: Subject to any disclaimer, the term of this patent is extended or adjusted under 35 U.S.C. 154(b) by 242 days.

(21) Appl. No.: 11/099,256

(22) Filed: Apr. 5, 2005

(65) Prior Publication Data

US 2006/0218818 A1 Oct. 5, 2006

(51) Int. Cl.
F26B 19/00 (2006.01)
F26B 25/00 (2006.01)
F26B 25/06 (2006.01)
(52) U.S. Cl. .............................. 34/666; 34/270; 34/271
(58) Field of Classification Search ............... 34/666, 34/270, 271; 15/DIG. 2, 302, 316.1, 306.1; 454/234, 235, 237, 239, 241, 244, 249, 252, 454/256, 309, 319, 333–336
See application file for complete search history.

(56) References Cited

U.S. PATENT DOCUMENTS

| | | | |
|---|---|---|---|
| 2,189,895 A * | 2/1940 | Grutzner | 454/229 |
| 3,446,272 A * | 5/1969 | Gaines, Jr. | 165/229 |
| 3,759,056 A * | 9/1973 | Graber | 454/75 |
| 3,805,410 A | 4/1974 | Rupp | |
| 4,836,467 A | 6/1989 | Rodgers | |
| 5,454,136 A * | 10/1995 | Gougoulas | 15/312.1 |
| 5,980,199 A | 11/1999 | Godichon | |
| 6,449,877 B1 | 9/2002 | Cote et al. | |
| 6,454,528 B2 | 9/2002 | McCabe | |
| 6,519,872 B2 | 2/2003 | McElroy et al. | |
| 7,150,112 B2 | 12/2006 | Faytlin | |
| 2001/0014284 A1 | 8/2001 | McCabe | |
| 2004/0250372 A1 | 12/2004 | McElroy | |

FOREIGN PATENT DOCUMENTS

DE 31 08 304 11/1982
DE 32 02 963 8/1983

* cited by examiner

Primary Examiner—Jiping Lu
(74) Attorney, Agent, or Firm—Harness, Dickey & Pierce, P.L.C.

(57) ABSTRACT

A dryer assembly includes a blower unit having an inlet and an outlet. A restriction mechanism having a plurality of louvers is disposed generally at the inlet of the blower unit with the louvers being moveable between an open position and a closed position. An actuation mechanism is in communication with the restriction mechanism. The actuation mechanism selectively restricts air to the blower unit by moving the louvers into the closed position.

18 Claims, 4 Drawing Sheets

CAR WASH DRYER AND METHOD

FIELD

The present teachings relate to dryer assemblies and more particularly to an improved dryer assembly for a car wash.

BACKGROUND

Dryer assemblies are conventionally used in car wash applications to impart a fluid force on an exterior of a vehicle once the vehicle has been fully washed and rinsed. The applied fluid force attempts to remove cleaning solution and moisture from the exterior of the vehicle prior to the vehicle exiting the car wash.

Conventional dryer assemblies usually include a funnel and a blower motor disposed generally between an inlet and an outlet of the dryer assembly. The funnel receives air generally at the inlet and directs the air to the blower motor for compression. The blower motor compresses the air received from the funnel prior to expelling the compressed air at the outlet. The compressed air is directed generally toward a moving vehicle below to remove excess cleaning solution and/or water from the exterior of the vehicle prior to the vehicle exiting the car wash.

Blower motors of conventional dryer assemblies may be configured to be constantly driven such that the motor is always energized or, alternatively, may be configured to be selectively driven only when a vehicle requires drying. When a blower motor is configured to be constantly driven, energy is wasted in driving the blower motor between vehicles. For example, vehicles are typically spaced apart in a conventional car wash to allow moving components of the wash to adequately access each vehicle for proper washing and drying. Blower motors that are constantly energized waste energy in providing a fluid force between adjacent vehicles. Such wasted energy is further exaggerated when few vehicles are cycled through the car wash such that the space between vehicles is increased.

Blower motors that are configured to be selectively shut down between vehicles require a surge of energy and at least two to three seconds to initially ramp up to full speed. Therefore, while blower motors that are selectively shut down between vehicles may realize a slight energy savings in not running between vehicles, some energy is wasted in continually ramping up and shutting down the blower motor. Furthermore, such configurations also decrease performance as the blower motor may not be up to full speed when the vehicle initially encounters the dryer assembly.

Therefore, a dryer assembly for a car wash that is capable of selectively restricting power consumption between vehicles while not sacrificing performance is desirable in the industry.

SUMMARY

A dryer assembly includes a blower unit having an inlet and an outlet. A restriction mechanism having a plurality of louvers is disposed generally at the inlet of the blower unit with the louvers being moveable between an open position and a closed position. An actuation mechanism is in communication with the restriction mechanism. The actuation mechanism selectively restricts air to the blower unit by moving the louvers into the closed position.

Further areas of applicability of the present teachings will become apparent from the detailed description provided hereinafter. It should be understood that the detailed description and specific examples, while indicating the preferred embodiment of the teachings, are intended for purposes of illustration only and are not intended to limit the scope of the teachings.

BRIEF DESCRIPTION OF THE DRAWINGS

The present teachings will become more fully understood from the detailed description and the accompanying drawings, wherein.

DETAILED DESCRIPTION

Figure 1:
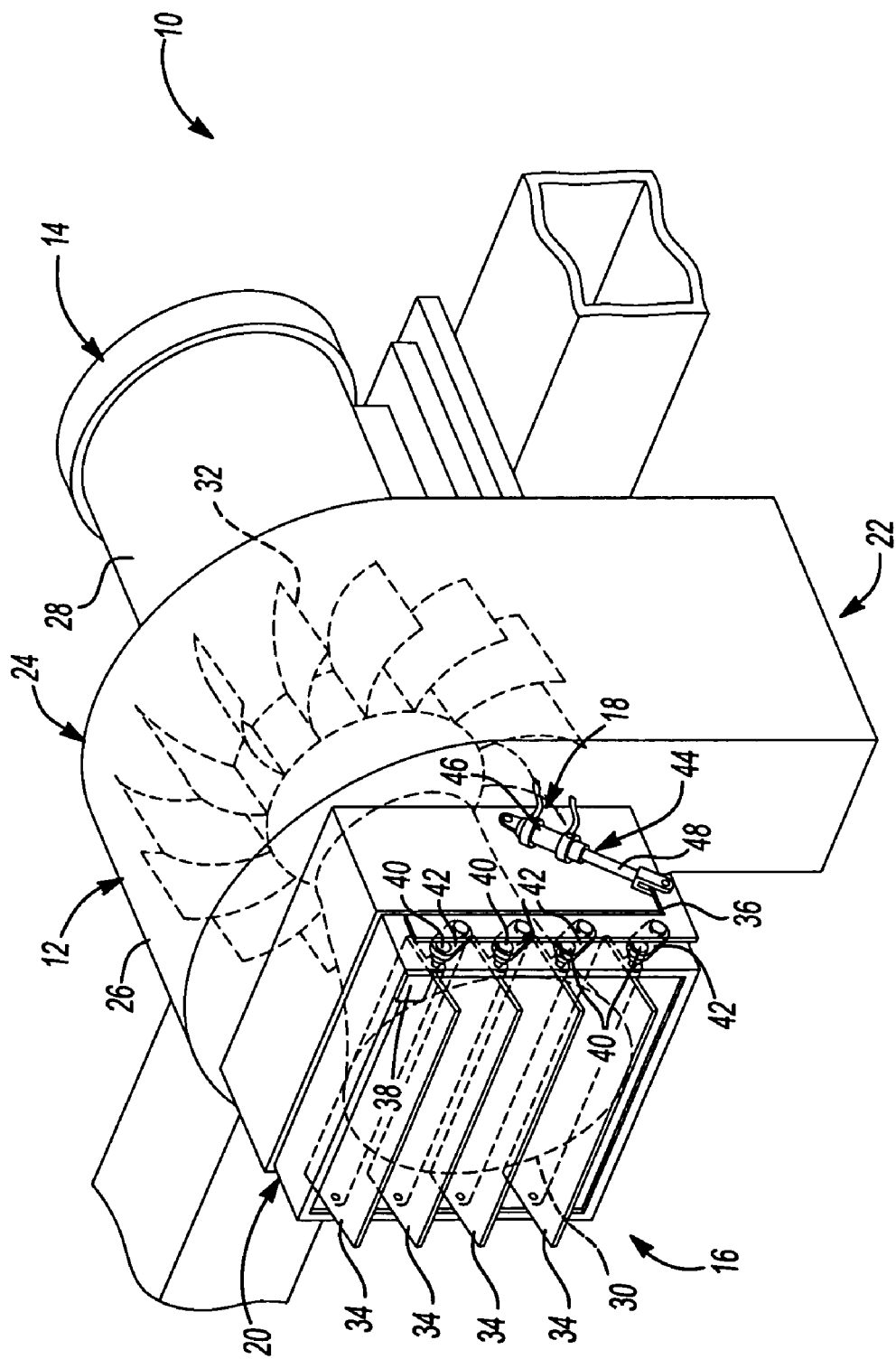
FIG. 1 is a perspective view of a dryer assembly in accordance with the present teachings with a series of louvers in an open position.

The following description is merely exemplary in nature and is in no way intended to limit the teachings, application, or uses.

With reference to the figures, a dryer assembly 10 is provided and includes a housing 12, a blower assembly 14, a restriction assembly 16, and an actuation assembly 18. The blower assembly 14 cooperates with the housing 12 to compress air received at an inlet 20 of the housing 12. The compressed air is expelled generally at an outlet 22 of the housing 12 to selectively provide a drying effect. The restriction assembly 16 and actuation assembly 18 are operably supported by the housing 12 and cooperate to selectively restrict air from reaching the blower assembly 14 when a drying effect is not required. Selectively preventing air from reaching the blower assembly 14 during periods when a drying effect is not required saves energy associated with operation of the blower assembly 14 and increases the efficiency of the dryer assembly 10.

The inlet and outlet 22 of the housing 12 are generally separated by a main body 24 having an arcuate portion 26. Arcuate portion 26 cooperates with the blower assembly 14 to compress air received at the inlet 20 and to direct the compressed air towards the outlet 22.

The blower assembly 14 is operably supported by the housing 12 and generally includes a blower motor 28, a funnel 30, and an impeller 32. The impeller 32 is disposed within the arcuate portion 26 of the housing 12, generally between the blower motor 28 and the funnel 30. In this manner, air received at the inlet 20 by funnel 30 is generally directed towards the impeller 32. The blower motor 28 includes an output shaft (not shown) that is fixably attached to the impeller 32 such that when the blower motor 28 is energized, the output shaft rotates the impeller 32 relative to the housing 12. When the motor 28 is energized, the impeller 32 draws an air stream generally from the inlet 20 along the funnel 30. Once the air reaches the rotating impeller 32, the air is compressed through interaction between the arcuate portion 26 of the housing 12 and the rotating impeller 32.

The restriction assembly 16 is operably supported near the inlet 20 of the housing 12 and includes a series of louvers 34, a link 36, and a pair of stops 38. Each of the louvers 34 is rotatably supported by the housing 12 between an open position and a closed position by a pin 40. The pins 40 are attached to respective louvers 34 generally at a midpoint of each louver 34 and are fixedly attached to an arm 42. The arm 42 extends generally from each pin 40 for pivotable attachment to the link 36 such that as the link 36 translates relative to the housing 12, the arms 42 rotate each of the pins 40.

Figure 2:
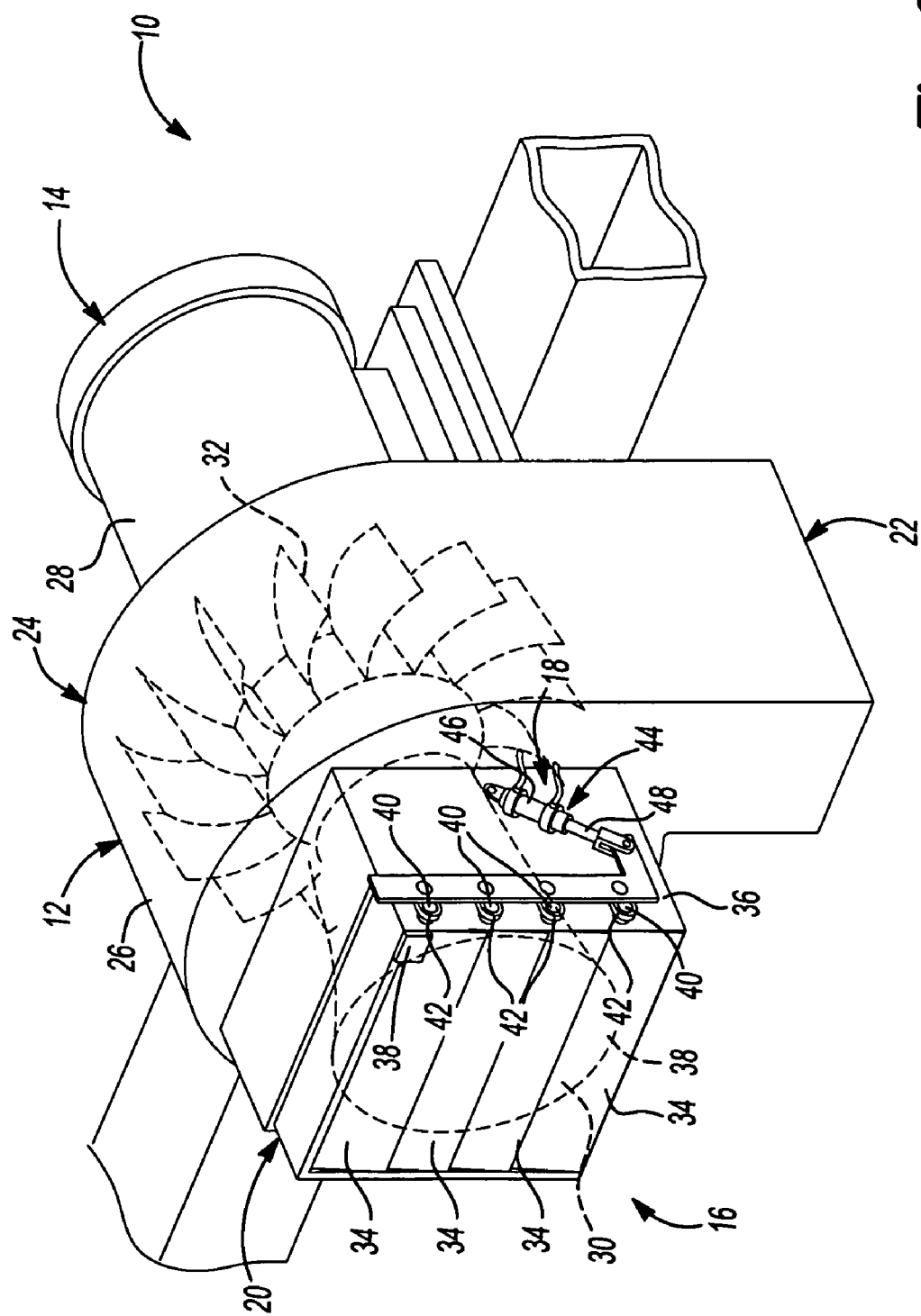
FIG. 2 is a perspective view of the dryer assembly of FIG. 1 with the series of louvers in a closed position.

Rotation of the pins 40 relative to the housing 12, causes concurrent rotation of each of the louvers 34. In this manner, movement of the link 36 relative to the housing 12 generally dictates the position of the louvers 34. When the link 36 is in a first position, the louvers 34 are in a fully-open position (FIG. 1). When the link 36 is translated from the first position to a second position, the louvers 34 are rotated from the fully-open position to a fully-closed position (FIG. 2).

The fully-open position is achieved when one of the louvers 34 engages the stops 38. The stops 38 are attached to an inner surface of the housing 12 generally at the inlet 20. Each stop 38 is positioned at an angle relative to the inlet 20 such that when one of the louvers 34 engages the stops 38, the louvers 34 are prevented from rotating to a position substantially perpendicular to the inlet 20. If the louvers 34 were permitted to rotate into a position generally perpendicular to the inlet 20, the louvers 34 may be over rotated. If the louvers 34 are over rotated, the louvers 34 may jam such that the link 36 cannot return the louvers 34 to the closed position. Therefore, the stops 38 ensure that the louvers 34, when in the fully-open position, are at an angle less than ninety degrees relative to the inlet 20 to prevent the louvers 34 from jamming.

For example, the stops 38 may be positioned such that upon engagement with one of the louvers 34 (i.e., when the louvers 34 are in the fully-open position), each of the louvers 34 are positioned between 65 and seventy degrees relative to the inlet 20. While only one of the louvers 34 engage the stops 38, each of the louvers 34 is similarly prevented from further rotation as each louver 34 is essentially tied to the rotation of the other louvers 34 via link 36. It should be understood that while a single link 36 is disclosed that another link 36 may be positioned on an opposite side of the housing 12 to additionally control operation of the louvers 34 between the open and closed positions. Furthermore, it should be understood that while a single pair of stops 38 is disclosed, that a plurality of stops may be positioned near the inlet 20 for engagement with more than one of the louvers 34.

When the louvers 34 in the fully-open position, a 15 horsepower blower motor 28 draws approximately 19.5 Amps at 480 volts. When the louvers 34 are moved into the fully-closed position, air is restricted from reaching the impeller 32 and resistance associated with rotating the impeller 32 is reduced. The reduction in resistance allows the blower motor 28 to consume less energy in rotating the impeller 32. For the above-described 15 horsepower blower motor 28, the resultant energy savings realized by closing the louvers 34 is roughly ten Amps. In other words, the 15 horsepower blower motor 28 only draws roughly 9.5 Amps when the louvers 34 are in the fully-closed position. Therefore, the dryer assembly 10 saves energy by closing the louvers 34 when a drying effect is not required.

Articulation of the link 36 relative to the housing 12 is generally accomplished by the actuation assembly 18. Therefore, the actuation assembly 18, via link 36, selectively positions the louvers 34 in either the fully-open position or the fully-closed position. The actuation assembly 18 may also position the louvers 34 in a plurality of partially-open positions generally between the fully-open position and the fully-closed position. When the louvers 34 are in a partially-open position, air is only partially restricted from reaching the impeller 32. Therefore, the dryer assembly 10 is only able to produce a partially-compressed air stream at outlet 22. The resultant partially-compressed air stream reduces the drying ability of the dryer assembly 10 but saves some energy by not requiring the blower motor 28 to produce a fully-compressed air stream.

The actuation assembly 18 is operably supported by the housing 12 and includes a piston/cylinder arrangement 44 having a cylinder 46 and an output shaft 48. The output shaft 48 translates relative to the cylinder 46 between a retracted position and an extended position. The output shaft is rotatably attached generally to the link 36 such that movement of the shaft 48 relative to the cylinder 46 causes the link 36 to concurrently translate relative to the housing 12. Therefore, when the output shaft 48 is articulated between the extended position and the retracted position, the louvers 34 are concurrently rotated between the open position and the closed position.

The piston/cylinder arrangement 44 may be designed such that the overall stroke of the output shaft 48 (i.e., distance the output shaft 48 moves relative to the cylinder 46 from the retracted position to the extended position) controls the position of the louvers 34 relative to the housing 12. For example, when the output shaft 48 is in the fully retracted position, the louvers 34 are in the closed state and when the louvers 34 are in the fully extended position, the louvers 34 are in the fully open state. Such a configuration obviates the need for stops 38 as movement of the louvers 34 into the open position is limited to the stroke of the output shaft 48. It should be understood, that the piston/cylinder arrangement 44 may be any suitable linear actuator such as a pneumatic cylinder, solenoid, or screw, but is not limited as such. Furthermore, it should be understood that while a single piston/cylinder arrangement 44 is disclosed that a second piston/cylinder arrangement 44 may also be used to control operation of another link 36 (i.e., if the dryer assembly 10 includes a pair of links 36).

Figure 3:
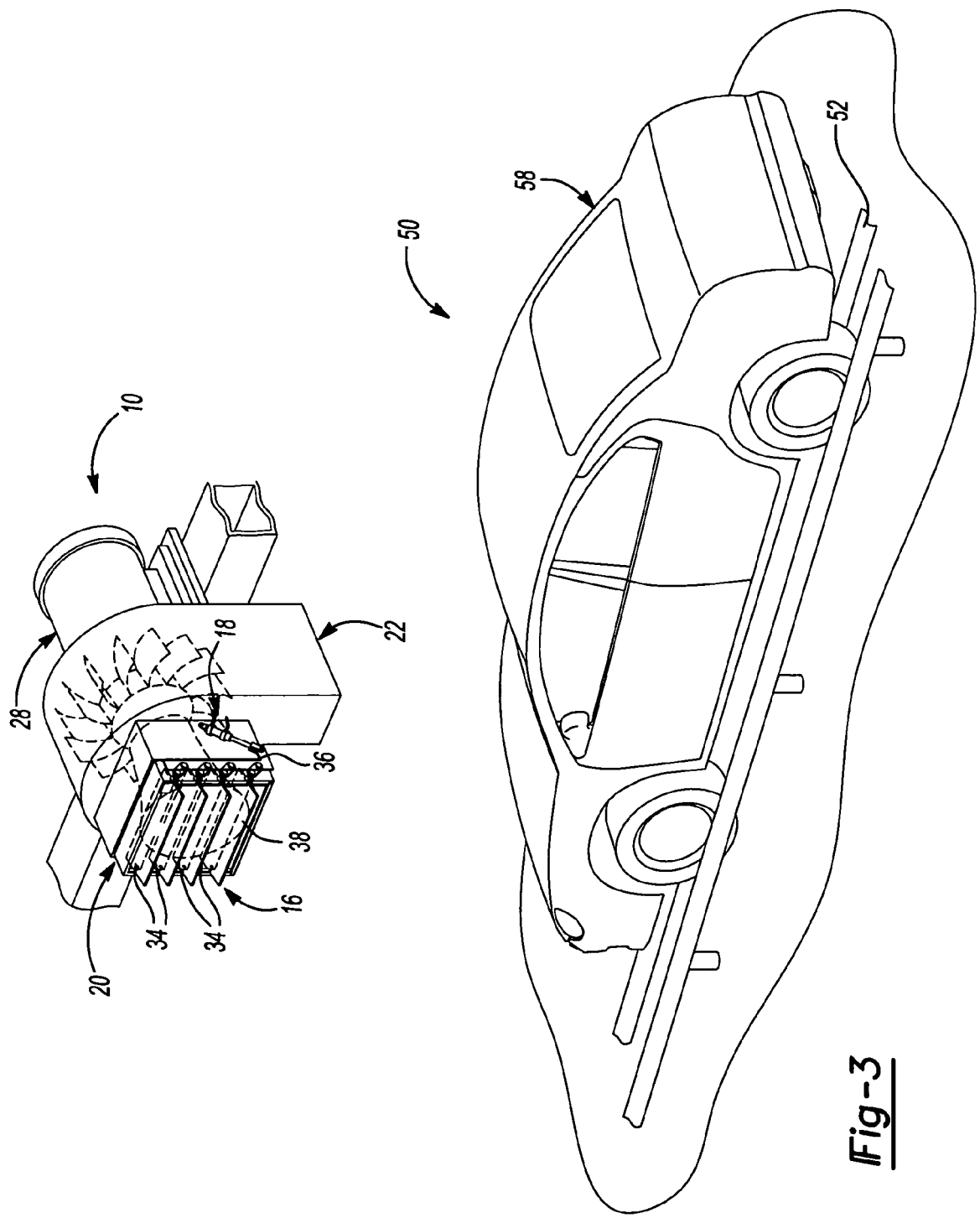
FIG. 3 is a perspective view of the dryer assembly of FIG. 1 incorporated into a car wash.
Figure 4:
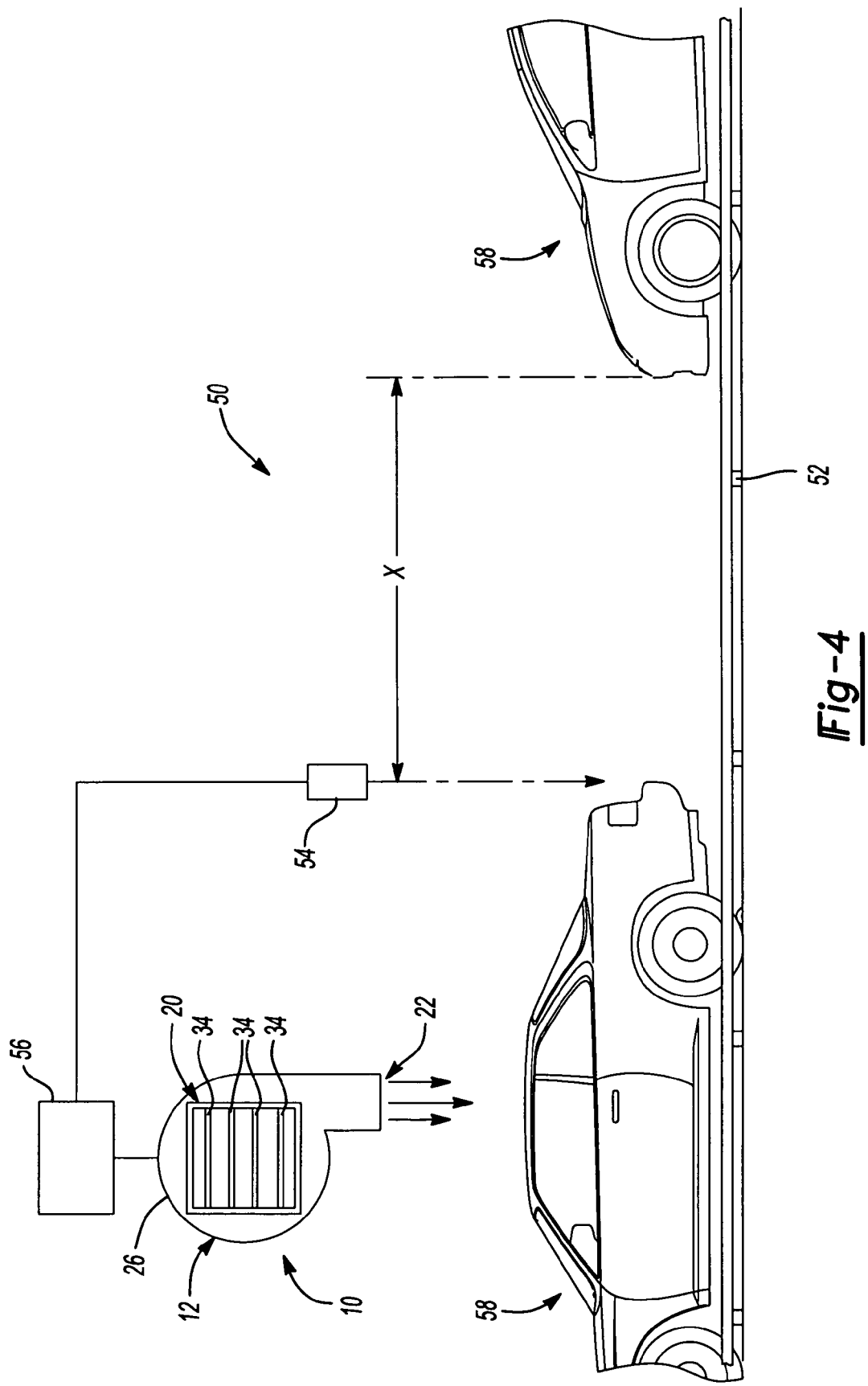
FIG. 4 is a side view of the dryer assembly of FIG. 1 incorporated into a car wash showing an actuation mechanism in communication with a restriction mechanism.

With particular reference to FIGS. 3 and 4, the dryer assembly 10 is shown incorporated into a car wash system 50. The car wash system 50 generally includes a drive unit 52, a position sensor 54, and a processing unit 56. The drive unit 52 selectively engages a series of vehicles 58 to move the vehicles 58 through the car wash system 50. The drive unit 52 positions each vehicle 58 at spaced intervals (represented by "X" in FIG. 4) to allow components associated with the car wash system 50 sufficient room to clean, wash, and dry each vehicle 58.

In operation, the drive unit 52 engages a vehicle 58 to pull the vehicle 58 through the car wash system 50. The vehicle 58 first encounters a wash cycle and a rinse cycle prior to reaching the dryer assembly 10. As can be appreciated, upon leaving the rinse cycle the vehicle 58 may have cleaning solution and water on an exterior surface thereof. The dryer assembly 10 imparts a fluid force on the exterior surface of the vehicle 58 to remove the excess cleaning solution and water prior to the vehicle 58 exiting the car wash system 50.

As the vehicle 58 leaves the rinse cycle, the position sensor 54 detects the approaching vehicle 58 before the vehicle 58 reaches the dryer assembly 10. When the sensor 54 detects the presence of the vehicle 58, a signal is sent to the processing unit 56 to alert the processing unit 56 that a vehicle 58 is approaching the dryer assembly 10. When the processing unit 56 receives the signal from the position sensor 54, the processing unit 56 energizes the blower motor 28 to allow the dryer assembly 10 to impart a fluid force on the exterior surface of vehicle 58.

The dryer assembly 10 is only permitted to impart a fluid force on the vehicle 58 when the louvers 34 are in the open position. If the louvers 34 remain the closed position when the motor 28 is energized, air is not permitted to be drawn into the housing 12 at the inlet 20. Under such conditions, the motor 28 is permitted to rotate the impeller 32 relative to the housing 12, but air is not drawn at the inlet 20 and therefore the impeller 32 is restricted from providing a compressed fluid stream at the outlet 22. Therefore, when the position sensor 54 detects the presence of an oncoming vehicle 58, the processing unit 56 also energizes the piston/cylinder arrangement 44 to translate the link 36 relative to the housing 12 and move the louvers 34 into the open position. It should be noted that the louvers 34 are not moved into the open position until the blower motor 28 reaches full speed to allow the motor 28 to ramp up when resistance is minimized. In so doing, energy associated with rotating the impeller 32 relative to the housing 12 is reduced and the efficiency of the dryer assembly 10 is improved.

Once the louvers 34 are in the open position, the blower motor 28 is permitted to draw air at the inlet 20 of the housing 12 and provide a compressed fluid stream at the outlet 22. The compressed fluid stream at the outlet 22 is imparted on an exterior surface of the vehicle 58 in an effort to remove any excess cleaning solution and water remaining on the exterior of the vehicle 58 after the rinse cycle.

The fluid force is continually applied to the vehicle 58 until the position sensor 54 detects an end of the vehicle 58. Once the position sensor 54 detects that the vehicle 58 has sufficiently passed the dryer assembly 10, the position sensor 54 sends a signal to the processing unit 56 that the vehicle 58 has been dried and has passed the dryer assembly 10. At this point, the processing unit 56 de-energizes the blower motor 28 and instructs the piston/cylinder arrangement 44 to retract the output shaft 48 and translate the link 36 relative to the housing 12. Translation of the link 36 relative to the housing 12 causes rotation of the louvers 34 from the open position (FIG. 1) to the closed position (FIG. 2).

In addition to the automatic control discussed above, it should be understood that an operator of the car wash system 50 may selectively override the processing unit 56 under certain conditions. For example, when a truck having a truck cab and truck box (neither shown) is pulled through the system 50, the operator may override the processing unit 56 when the truck box is below the outlet 22 of the dryer assembly 10. In so doing, the operator is able to prevent water and/or cleaning solution disposed within the truck box from spraying on the exterior of the truck.

Closing the louvers 34 once the vehicle 58 has passed the dryer assembly 10 reduces wear on the blower motor 28 and maintains impeller speed when the motor 28 is de-energized. When the louvers 34 are in the fully-closed position, air is restricted from reaching the impeller 32, as previously discussed. Therefore, when the motor 28 is de-energized, and the louvers 34 are in the fully-closed position, resistance on the motor 28 is minimized and wear on internal components associated with de-energizing the motor 28 is reduced. The reduction in resistance provides a further benefit in that the impeller 32 is essentially permitted to freely rotate once the motor 28 is de-energized. The free rotation of the impeller 32 allows the impeller 32 to maintain a rotational speed for a longer time period following de-energization of the blower motor 28. In this manner, when the blower motor 28 is energized once again (e.g., due to another on-coming vehicle 58), less energy is required to ramp the motor 28 up to full speed.

The louvers 34 remain in the closed position until the position sensor 54 detects the presence of an approaching vehicle 58. When the position sensor 54 detects an approaching vehicle 58, the positions sensor 54 relays the information the processing unit 56. Once the processing unit 56 receives the information from the position sensor 54 that a vehicle 58 is approaching the dryer assembly 10, the processing unit 56 energizes the blower motor 28. The louvers 34 remain in the fully-closed position until the blower motor 28 achieves full speed to reduce the resistive force applied to the impeller 32 associated with drawing air at the inlet 20. In so doing, the processing unit 56, in conjunction with the louvers 34, is able to save energy associated with ramping up the blower motor 28 between vehicles 58.

The processing unit 56 instructs the piston/cylinder arrangement 44 to once again extend the output shaft 48 and translate the link 36 relative to the housing 12 once the blower motor 28 is fully energized and the impeller 32 reaches full speed. As previously discussed, translation of the link 36 relative to the housing 12 causes concurrent rotation of the louvers 34. Sufficient rotation of the louvers 34 relative to the housing 12 causes the louvers 34 to move from the closed position (FIG. 2) to the open position (FIG. 1).

Once the louvers 34 are returned to the open position, the blower motor 28 is once again able to draw air at the inlet 20 of the housing 12. The influx of air at the inlet 20 causes a resistive force to be applied on the impeller 32, thereby increasing the energy required to continually drive the blower motor 28.

With the louvers 34 in the open position, and the blower motor 28 energized, the dryer assembly 10 is once again able to impart a fluid force on the exterior surface of the vehicle 58. The louvers 34 remain in the open position until the position sensor 54 once again detects that the vehicle 58 has sufficiently passed the dryer assembly 10. At this point, the position sensor 54 relays information to the processing unit 56 that the vehicle 58 has sufficiently passed the dryer assembly 10. The processing unit 56 instructs the piston/cylinder arrangement 44 to once again retract the output shaft 48 to translate the link 36 relative to the housing 12 and move the louvers 34 into the closed position. In addition, the processing unit 56 also de-energizes the blower motor 28 once the louvers 34 achieve the fully-closed position.

As described, the dryer assembly 10, in conjunction with the car wash system 50, is able to selectively open and close the louvers 34 to selectively restrict air to the blower motor 28. By restricting air to the blower motor 28 when a fluid force is not required at the outlet 22 (i.e., when a vehicle 58 is generally below the dryer assembly 10), the dryer assembly 10 is able to save energy associated with driving the blower motor 28 and, as a result, improve the efficiency of the car wash system 50.

The description of the teachings is merely exemplary in nature and, thus, variations that do not depart from the gist of the teachings are intended to be within the scope of the teachings. Such variations are not to be regarded as a departure from the spirit and scope of the teachings.

What is claimed is:

1. A car wash system comprising:
    a drive mechanism for moving vehicles through the system at spaced intervals;
    a dryer assembly comprising:
    a blower unit having an inlet, an outlet, a blower motor operable between an energized state and a de-energized state, and an impeller driven by the blower motor;
    a restriction mechanism having a plurality of louvers disposed at said inlet of said blower unit, said louvers moveable between an open position and a closed position;
    at least one sensor that detects a position of a vehicle relative to said dryer assembly;
    an actuation mechanism in communication with said restriction mechanism and operable to selectively restrict air to said blower unit by moving said louvers into said closed position; and a processing unit instructing said actuation mechanism to maintain said louvers in said closed position when said blower motor is moved from said de-energized state to said energized state and opening said louvers once said blower motor reaches substantially full speed in response to a first detected position by said at least one sensor of an approaching vehicle and moving said louvers into said closed position when said blower motor is moved from said energized state to said de-energized state in response to a second detected position by said at least one sensor of an exiting vehicle to allow said impeller to freely rotate.

2. The car wash system of claim 1, wherein said actuation mechanism includes a link in mechanical communication with said louvers.

3. The car wash system of claim 1, wherein said actuation mechanism includes an air cylinder operable to toggle said louvers between said open position and said closed position.

4. The car wash system of claim 1, wherein said actuation mechanism includes a solenoid operable to toggle said louvers between said open position and said closed position.

5. The car wash system of claim 1, further comprising a housing disposed at said inlet and rotatably supporting said louvers.

6. The car wash system of claim 5, wherein said housing includes a stop operable to restrict rotation of said louvers to position said louvers in said open position.

7. The car wash system of claim 1, wherein said blower unit compresses air received at said inlet when said louvers are in said open position and expels compressed air at said outlet.

8. The car wash system of claim 1, further comprising a funnel disposed between said inlet and said blower unit that directs air from said inlet to said blower motor.

9. The car wash system of claim 1, wherein said actuation mechanism moves said louvers into said closed position when said blower motor is de-energized to reduce air flow into said inlet when said blower motor is decelerating.

10. A system for drying vehicles comprising:
a drive mechanism for moving vehicles through the system at spaced intervals;
at least one dryer assembly including:
a blower motor disposed within a housing having an inlet and an outlet, said blower motor operable in an energized state to selectively apply fluid pressure to the moving vehicles at said outlet;
an impeller driven by said blower motor;
a restriction mechanism having a plurality of louvers rotatably supported by said housing at said inlet between an open position allowing fluid to said blower motor and a closed position restricting fluid to said blower motor;
at least one sensor that detects a position of a vehicle relative to said at least one dryer assembly;
an actuation mechanism that selectively toggles said louvers between said open position and said closed position based on a position of a vehicle relative to said at least one dryer assembly; and
a processing unit instructing said actuation mechanism to maintain said louvers in said closed position to reduce air flow into said inlet when said blower motor is energized to allow said impeller to reach substantially full speed, and opening said louvers once said impeller achieves substantially full speed in response to said at least one sensor indicating a vehicle is approaching said at least one dryer assembly.

11. The system of claim 10, wherein said actuation mechanism positions said louvers in said closed position when said at least one sensor indicates a vehicle has passed said at least one dryer assembly.

12. The system of claim 10, wherein said louvers are in said open position when a vehicle is proximate to said outlet and said louvers are in said closed position when a vehicle is not proximate to said outlet.

13. The system of claim 10, wherein said actuation mechanism includes a link in mechanical communication with said louvers.

14. The system of claim 10, wherein said actuation mechanism includes an air cylinder operable to toggle said louvers between said open position and said closed position.

15. The system of claim 10, wherein said actuation mechanism includes a solenoid operable to toggle said louvers between said open position and said closed position.

16. The system of claim 10, wherein said housing includes a stop operable to restrict rotation of said louvers to position said louvers in said open position.

17. The system of claim 10, further comprising a funnel disposed between said inlet and said blower motor said funnel operable to direct air from said inlet to said blower motor.

18. The system of claim 10, wherein said actuation mechanism moves said louvers into said closed position when said blower motor is de-energized to reduce air flow into said inlet when said blower motor is decelerating.

* * * * *